(12) United States Patent
Dixon et al.

(10) Patent No.: US 6,205,766 B1
(45) Date of Patent: Mar. 27, 2001

(54) FLUID FLOW VALVE AND FLUID FLOW SYSTEM

(75) Inventors: Glyn Edward Dixon, Gloucestershire; Trevor Stanley Smith, Sutton Coldfield, both of (GB)

(73) Assignee: Lucas Industries, London (GB)

( * ) Notice: Subject to any disclaimer, the term of this patent is extended or adjusted under 35 U.S.C. 154(b) by 0 days.

(21) Appl. No.: 09/184,762

(22) Filed: Nov. 2, 1998

(30) Foreign Application Priority Data

Jul. 11, 1997 (GB) .................................................. 9723466

(51) Int. Cl.$^7$ ....................................................... F02C 9/28
(52) U.S. Cl. ..................................... 60/39.091; 60/39.281
(58) Field of Search ............................ 60/39.281, 39.091; 137/117

(56) References Cited

U.S. PATENT DOCUMENTS

| | | | |
|---|---|---|---|
| 4,546,786 | * 10/1985 | Koike | .................................. 137/117 |
| 5,235,806 | * 8/1993 | Pickard | .............................. 60/39.281 |
| 5,315,818 | * 5/1994 | Smith | ................................. 60/39.281 |
| 5,555,720 | 9/1996 | Wernberg et al. | ................... 60/39.03 |
| 5,709,079 | * 1/1998 | Smith | ................................. 60/39.281 |

* cited by examiner

Primary Examiner—Timothy S. Thorpe
Assistant Examiner—Ehud Gartenberg
(74) Attorney, Agent, or Firm—Wells, St. John, Roberts, Gregory & Matkin, P.S.

(57) ABSTRACT

A fluid flow system for supplying fuel to an engine, the system including a fluid flow valve having a valve element movable alternatively to a first operative position in which a relatively low fluid flow rate is permitted through the valve, for achieving a normal gradual shut-off of fuel supply, and a second operative position in which a relatively high fluid flow rate is permitted through the valve, for achieving a rapid emergency shut-off of fuel supply. Also disclosed is a fluid flow valve for use in the system. The invention has application in aircraft gas turbine engines.

9 Claims, 2 Drawing Sheets

FLUID FLOW VALVE AND FLUID FLOW SYSTEM

This invention relates to a fluid flow valve having a plurality of operative states corresponding to respective operative conditions in a fluid flow system to which it is adapted for connection in use, the valve being switchable between its operable states to modify the condition of the system correspondingly.

The invention is particularly, but not exclusively, applicable to a fuel supply system for an aircraft gas turbine engine, in which three operative conditions may provide, for example, a normal fuel flow from a metering valve to the engine, a normal shut-down condition in which fuel flow is progressively reduced, and a rapid shut-down or emergency condition in which the fuel supply is interrupted very rapidly to prevent damage to the engine and/or associated components.

According to a first aspect of the invention, a fluid flow system for supplying fuel to an engine includes a fluid flow valve comprising a valve element movable alternatively to a first operative position in which a relatively low fluid flow rate is permitted through the valve, for achieving a normal gradual shut-off of fuel supply, and a second operative position in which a relatively high fluid flow rate is permitted through the valve, for achieving a rapid emergency shut-off of fuel supply.

Preferably, the relatively low flow rate is obtained by way of a restricted flow path through which the fluid is directed in said first operative position of the valve element, the fluid being directed through a less restricted flow path when the valve element is in the second said operative position.

In one convenient arrangement, the valve is of the centre-stable type, being preferably a spool valve, the valve element being movable from a central position to either of said two operative positions, as required.

The valve may comprise a port incorporating flow restriction means serving to restrict flow along said restricted flow path.

Typically, movement of the valve element is controlled by a torque motor, preferably of the multi-coil type.

Fluid flow may selectively be permitted through the valve body along first respective alternative restricted and less restricted flow paths connecting a high pressure fluid source to a servo chamber of a shut-off valve and second respective alternative restricted and less restricted flow paths connecting a servo chamber of a spill valve to a low pressure region.

In a typical practical arrangement, the fluid flow system includes a metering valve operable to provide, from a high pressure input flow, a metered fuel supply to a gas turbine engine via the normally open shut-off valve, the pressure drop across the metering valve being maintained substantially constant by the spill valve, the fluid flow valve having two pairs of valve ports arranged so that, in one of its said operative positions, the valve permits flow through one port from each pair such as to provide a relatively low flow rate respectively along the first restricted flow path to the shut-off valve servo chamber and along the second restricted flow path from the spill valve servo chamber, whereby a normal gradual shut-off of the fuel supply is achieved, and in the other of said operative positions, permits flow through the other port from each pair to provide a relatively high flow rate respectively along the first less restricted flow path to the shut-off valve servo chamber and along the second less restricted flow path from the spill valve servo chamber whereby a rapid emergency shut-off of the fuel supply is achieved.

According to another aspect of the invention, a fluid flow valve comprises a valve body incorporating a valve element movable alternatively to two operative positions in which respectively relatively low and relatively high fluid flow rates are permitted through the valve body, flow restriction means being provided in the valve body for causing said relatively low fluid flow rate.

The invention will now be described, by way of example, with reference to the accompanying drawings in which.

Figure 1:
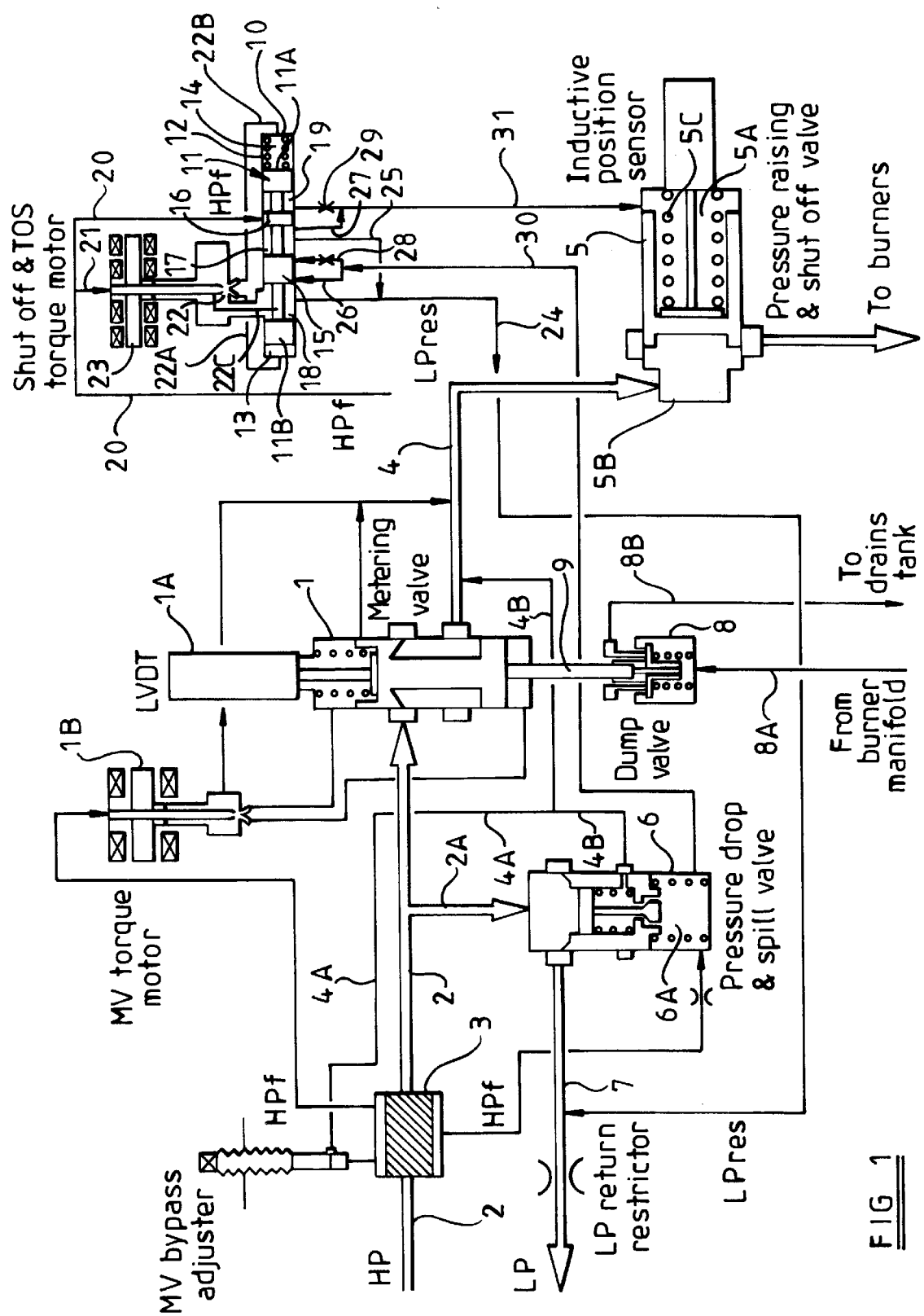
FIG. 1 is a diagrammatic representation of one embodiment of the fluid flow system of the invention in the form of a fuel control system for a gas turbine engine and incorporating a fluid flow valve of the invention.

The fuel control system illustrated in FIG. 1 contains a metering valve 1 supplied from a high pressure fuel line 2. The high pressure is derived from a pump (not shown) and servo pressures HPf are provided via a filter 3 incorporated in the line 2. The metering valve acts, under the influence of a linear variable differential transformer 1A, and torque motor 1B working in a closed loop servo system, to control the flow of high pressure fluid into a supply line 4 for delivery to the burners of the gas turbine engine via a pressure raising and shut-off valve (PRSOV) 5. It is important to maintain the pressure drop across the metering valve substantially constant and, for this purpose, a branch 2A of the high pressure line is connected to a pressure drop and spill valve (PDSV) 6 which also senses pressure downstream of the metering valve via line 4B. Spill flow from the valve 6 is directed via line 7 to a low pressure region at the inlet to the high pressure pump.

A dump valve 8 is operatively associated with the metering valve by way of a rigid connecting element, such as a rod 9, and works in conjunction with the metering valve so that, when the latter is in its fully closed position, the dump valve opens to receive fuel via a line 8A from a burner manifold and direct this via a line 8B to a low pressure drain tank. The dump valve 8 may be rigidly connected to the metering valve or may be simply engaged and pushed by a movable element such as a rod, of the metering valve. The arrangement and normal operation of the aforesaid system components will be well understood by a person skilled in the art and require no further description for the purpose of the present invention. A three-position control valve, illustrated as a spool valve 10, serves to initiate changes in the operational condition of the system, in the manner to be described. A spool 11 of the control valve slides within a cylinder body and has respective end portions 11A, 11B arranged to slide within pressure chambers 13, 14. The spool 11 is urged by a spring 12 to the left, as viewed in the drawing and the pressure chambers 13, 14 receive pressure fluid for the purpose of actuating the spool, in the manner to be described. A central region of the spool is provided with first and second lands 15, 16, between which is formed a central chamber 17. Further chambers 18, 19 are formed respectively between the land 15 and end portion 11B and between the land 16 and end portion 11A. Filtered high pressure fuel is supplied to the control valve via a line 20, a branch 21 of this line feeding the high pressure fluid to a control valve 22, shown as a jet pipe servo valve, serving to control the proportion of supply pressure fed to chambers 13 and 14 via lines 22A and 22B supplying these chambers. The valve 22 is activated by a multi-coil torque motor 23, in conventional manner. A line 24 provides a permanent connection between the chamber 18 of the spool valve and the low pressure return line 7 and a line 25 provides a connection between the line 24 and chamber 17.

The spool valve is provided with two pairs of connections, each pair providing an unrestricted flow path 26, 27 and a restricted flow path 28, 29, it being understood that the restricted paths may be embodied in the valve itself or in an output line from the body, or at any other convenient location. A line 30 provides a connection between a servo chamber 6A of the PDSV valve 6 and a location common to the connections 26, 28. A line 31 provides a connection between a servo chamber 5A of the PRSOV and a location common to the connections 27, 29.

When there is no electrical input to torque motor 23, the valve 10 is held in the neutral (central) position as shown in FIG. 1. This is achieved by a feedback spring 22C which is connected between the spool 11 and the control valve 22. If there is any deviation in position of spool 11 away from the centre position, the feedback spring 22C deflects the control valve 22 to increase the pressure in line 22A and decrease the pressure in line 22B (or vice versa) so as to create a correcting force on spool 11 and return it to the centre position. With the valve in the illustrated neutral position, an unrestricted low pressure connection exists from chamber 1 7 via lines 27 and 31 to the chamber 5A of the PRSOV. This enables high pressure fuel applied to chamber 5B the PRSOV to open this valve and permit the requisite flow of fuel from the line 4 through the valve to the engine burners. The land 15 is positioned to block both of the outlets 26 and 28, preventing servo-pressure in the chamber 6A of the PDSV from being connected to low pressure, thereby enabling this valve to function normally and maintain the metering pressure drop substantially constant.

Figure 2:
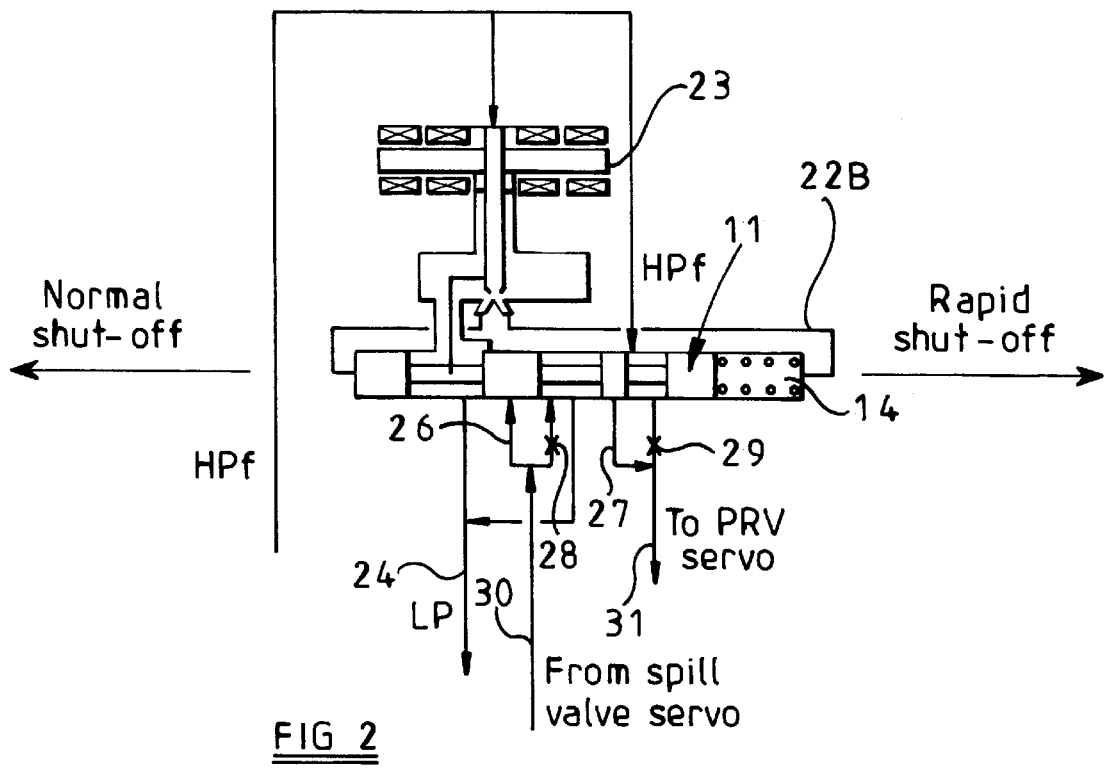
FIG. 2 is an enlarged representation of the fluid flow valve in an operational state different from that illustrated in FIG. 1.

In order to effect a normal shut-down of the engine, the torque motor 23 is actuated to supply high pressure to the chamber 14 of the valve via line 22B, urging the spool to its extreme left hand position, as illustrated in FIG. 2. The torque motor (i.e. control valve 22) is magnetically latched in this position. With the valve in this position, high pressure fuel is supplied via the restricted connection 29 to the chamber 5A of the PRSOV, which is able, with the assistance of a spring 5C in chamber 5A, progressively to overcome the pressure in the chamber 5B to produce a gradual shut-down of fuel supply to the engine. Simultaneously, chamber 6A of the PDSV is connected to low pressure via restricted line 28, causing this valve to open gradually and spill high pressure from the line 2 via lines 2A and 7 away from the metering valve. With the valve in the FIG. 2 position, therefore, a normal progressive shut-down of the engine takes place.

Figure 3:
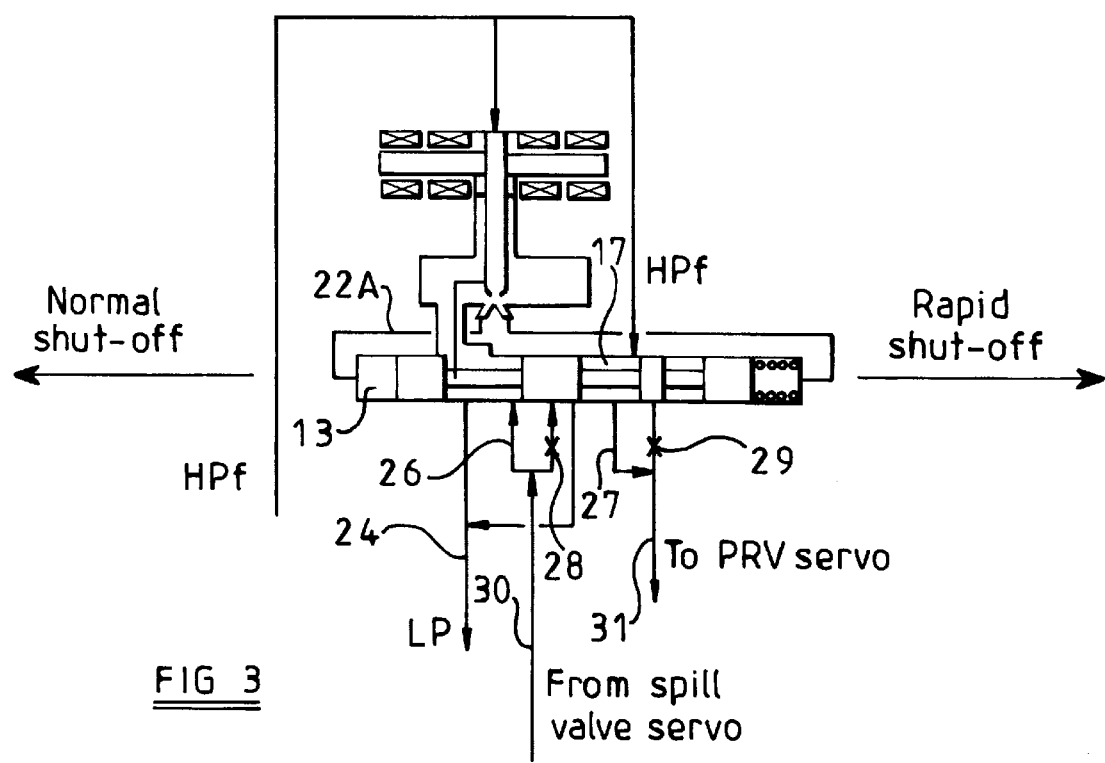
FIG. 3 is a view similar to that of FIG. 2 illustrating the valve in a further alternative operational state.

In an emergency situation, it can be necessary to shut down the engine rapidly and this is achieved by actuating the control valve 10 to move the spool 11 rightwards to its other extreme position as illustrated in FIG. 3. The valve then supplies high pressure directly from the chamber 17 through the connection 27 and line 31 to the chamber 5A of the PRSOV, causing this valve to close rapidly and interrupt fuel supply to the engine burners. Simultaneously, the PDSV servo pressure in chamber 6A is connected directly to low pressure via lines 30 and 26, causing this valve to open rapidly and spill high pressure fuel from line 2 via lines 2A and 7 to the low pressure region. With the valve in the FIG. 3 position, therefore, a rapid shut-down of the engine takes place, as required in an emergency situation.

It will be understood that the valve of the invention may be applied to systems other than the fuel flow system described above and the illustrated spool valve may be replaced by any mechanical or electrical valve device capable of switching fluid flow from a full flow to a restricted flow and/or vice versa.

What is claimed is:

1. A fluid flow system operable to supply fuel to an engine, the system including a fluid flow valve comprising a valve element movable alternatively to a first operative position in which a relatively low fluid flow rate is permitted through the valve along a restricted flow path so as to achieve a normal gradual shut-off of fuel supply, and a second operative position in which a relatively high fluid flow rate is permitted through the valve along a less restricted flow path so as to achieve a rapid emergency shut-off of fuel supply, wherein fluid flow is selectively permitted through the valve along a first respective one of said restricted and less restricted flow paths connecting a high pressure fluid source to a servo chamber of a shut-off valve, and a second respective one of said restricted and less restricted flow paths connecting a servo chamber of a spill valve to a low pressure region.

2. A system as claimed in claim 1, wherein the relatively low flow rate is obtained by way of a restricted flow path through which the fluid is directed in said first operative position of the valve element, the fluid being directed through a less restricted flow path when the valve element is in the second said operative position.

3. A system as claimed in claim 2, the valve comprising a port incorporating flow restriction means serving to restrict flow along said restricted flow path.

4. A system as claimed in claim 1, wherein the valve is of the center-stable type, the valve element being movable from a central position to either of said two operative positions, as required.

5. A system as claimed in claim 1, wherein the valve is a spool valve.

6. A system as claimed in claim 1, wherein a torque motor controls movement of the valve element.

7. A system as claimed in claim 6, said motor being of the multi-coil type.

8. A system as claimed in claim 1, including a metering valve operable to provide, from a high pressure input flow (HP), a metered fuel supply to a gas turbine engine via a normally open shut-off valve, the pressure drop across the metering valve being maintained substantially constant by a spill valve, the fluid flow valve having two pairs of valve ports arranged so that, in one of its said operative positions, the valve permits flow through one port from each pair such as to provide a relatively low flow rate respectively along the first restricted flow path to the shut-off valve servo chamber and along the second restricted flow path from the spill valve servo chamber, whereby a normal gradual shut-off of the fuel supply is achieved, and in the other of said operative positions, permits flow through the other port from each pair to provide a relatively high flow rate respectively along the first less restricted flow path to the shut-off valve servo chamber and along the second less restricted flow path from the spill valve servo chamber whereby a rapid emergency shut-off of the fuel supply is achieved.

9. A fluid flow valve, for use in a system as claimed in claim 1, comprising a valve body incorporating a valve element movable alternatively to two operative positions in which respectively relatively low and relatively high fluid flow rates are permitted through the valve body, flow restriction means being provided in the valve body for causing said relatively low fluid flow rate.

\* \* \* \* \*